July 10, 1951 W. E. GLENN, JR 2,560,167
PULSE SHAPING CIRCUIT
Filed Nov. 22, 1949
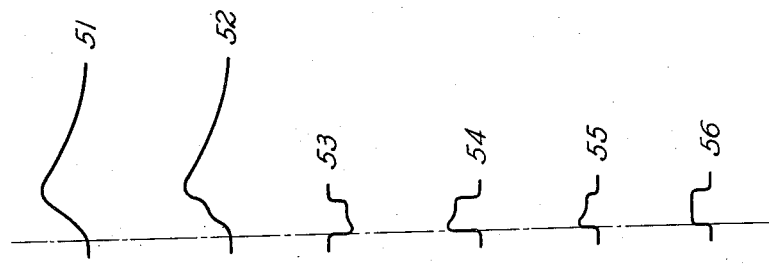
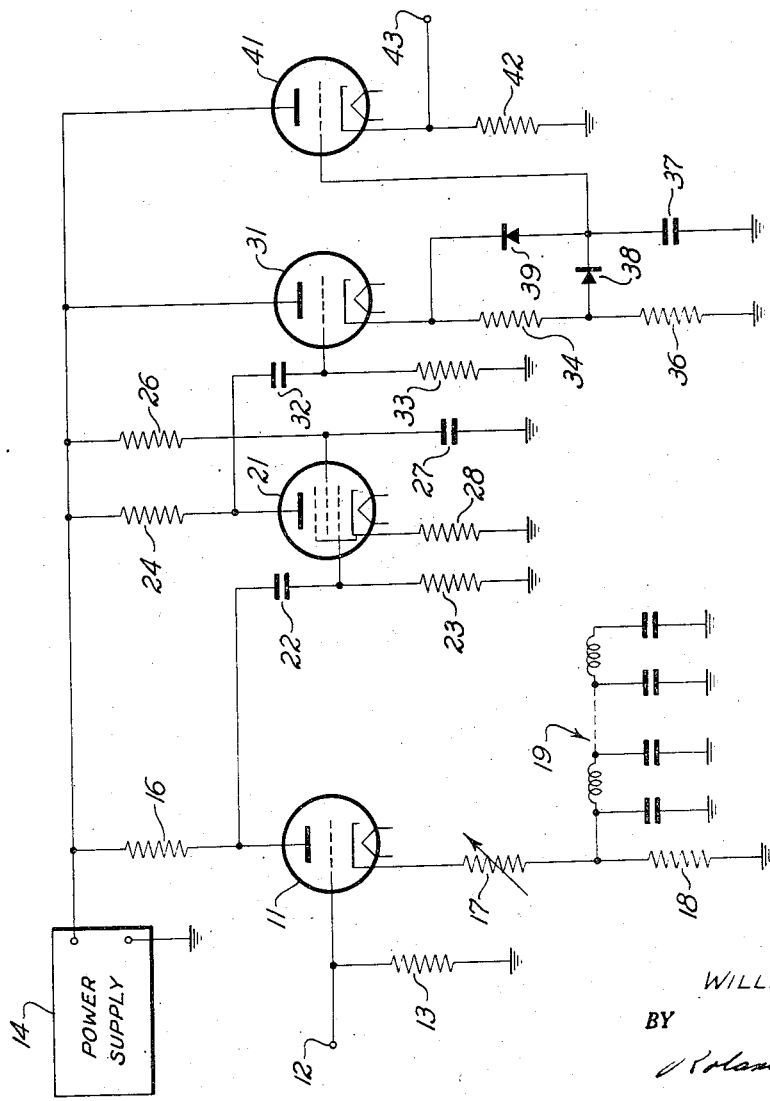
INVENTOR.
WILLIAM E. GLENN, Jr.
BY
Roland A. Anderson
ATTORNEY.

Patented July 10, 1951

2,560,167

UNITED STATES PATENT OFFICE 2,560,167

PULSE SHAPING CIRCUIT

William E. Glenn, Jr., Berkeley, Calif., assignor to the United States of America, as represented by the United States Atomic Energy Commission Application November 22, 1949, Serial No. 128,772

5 Claims. (Cl. 250—27)

This invention relates to a circuit network and more particularly to a pulse shaping circuit.

Many forms of pulse shaping circuits have been developed for various types of electronic devices to develop pulses of voltage having a certain predetermined height and duration with respect to a reference or input pulse of voltage. In many instances it has been found desirable to reduce the width and to square or flatten the top of a given pulse of voltage. Heretofore, complex circuits requiring many tubes and associated circuit elements have been devised to accomplish such pulse height squaring and width reduction in an accurate and predetermined manner. It has been found that excellent results are attained by a relatively simple circuit comprising a combination of a pulse sharpener, an amplifier, a pulse flattening network, and an output circuit. The output voltage of this circuit then accurately bears a predetermined relationship with the height of the input pulse of voltage and has a predetermined duration.

It is therefore an object of the present invention to provide a new and improved pulse shaping circuit.

Another object of the present invention is to provide a pulse shaping circuit comprising a pulse sharpener, an amplifier, a pulse flattening circuit, and a cathode follower output circuit.

A further object of the present invention is to provide a pulse shaping circuit for developing an output pulse of voltage having a predetermined proportional height and a predetermined duration in response to an input pulse of voltage.

A still further object of the present invention is to provide a pulse sharpening circuit employing an electronic network wherein an open circuit artificial transmission line is utilized to determine the duration of an output pulse.

Another important object of the present invention is to provide a network comprising a condenser and a pair of diode crystals for squaring or flattening the developed pulse of voltage without sacrificing pulse height proportionality.

Still another object of the invention is to provide a pulse shaping circuit of simple construction utilizing commercial radio parts well within their rating.

Other objects and advantages will be apparent in the following description considered together with the accompanying drawing, in which:

Figure 1 is a schematic wiring diagram embodying the invention; and

Fig. 2 is a series of time correlated voltage wave forms representing voltages at various points in the circuit.

Referring now to the drawing in detail, and Fig. 1 in particular, there is shown a triode tube 11 which is connected in the form of a pulse sharpener. The control grid of the tube 11 is directly connected to an input terminal 12. A resistor 13 is connected from the control grid of the tube 11 to ground to develop a bias voltage for the tube from the input voltage. To provide an operating voltage for the tube 11 the anode is connected to a suitable conventional source 14 of unidirectional voltage through a dropping resistor 16. To provide degeneration in the circuit of the tube 11, a potentiometer 17 and a resistor 18 are series connected between the cathode and ground. As a means of developing a pulse having a predetermined duration a section of an open circuit artificial transmission line 19 is connected to the junction between the potentiometer 17 and the resistor 18. The transmission line 19 is preferably comprised of a plurality of suitably connected inductors and condensers, the values of which are chosen to give a desired time constant to the line and to pass a broad band of frequencies. The operation of the circuit will be more fully described hereinafter.

The voltage at the anode of the tube 11 is coupled to the control grid of a pentode tube 21 through a coupling condenser 22 and is developed across a grid bias resistor 23 which is connected between the control grid and ground. The connections of the tube 21 are in the form of a conventional wide band pass amplifier and are as follows: the anode is connected to the voltage source 14 through a dropping resistor 24, the suppressor grid is directly connected to the cathode, the screen grid is connected to the voltage source 14 through a dropping resistor 26 and to ground through a by-pass condenser 27, and the cathode is connected to ground through a cathode resistor 28. The principal purpose of this amplifier tube 21 is to invert the output of the tube 11 and afford distortionless amplification.

The voltage appearing at the anode of the tube 21 is connected to the control grid of a triode tube 31 through a condenser 32 and is developed across a grid bias resistor 33. The tube 31 is connected in the form of a cathode follower with the anode directly connected to the voltage source 14 and the cathode connected to ground through two series connected resistors 34 and 36. To flatten or square the top of the pulse of voltage appearing across the resistor 36, the common point between the resistors 34 and 36 is connected to one side of a condenser 37 through a crystal diode 38 which is connected in proper polarity so that current will pass when the common point between the resistors is more positive. The other side of the condenser 37 is connected to ground to complete the connection. As a means of discharging the condenser 37, a second crystal diode 39 is connected between the ungrounded side of the condenser to the cathode of the tube 31 in such polarity that current will pass when the condenser is charged more positively than the cathode of the tube 31.

The voltage across the condenser 37 is connected to the control grid of a triode tube 41 connected as a cathode follower which serves as the output circuit. The anode of the tube 41 is directly connected to the voltage source 14 and the cathode is connected to ground through a cathode resistor 42. The voltage across the cathode resistor 42 is utilized as the output voltage of the pulse shaping circuit and, therefore, the cathode of the tube 41 is connected to an output terminal 43.

Now consider the operation of the present invention constructed in accordance with the foregoing description and suitably supplied with an operating voltage from the conventional voltage source 14. The heater elements of the tubes 11, 21, 31, and 41 are properly energized by a suitable source of voltage (not shown). Under these conditions a positive pulse of voltage, having a waveform 51 as shown on Fig. 2, impressed at the input terminal 12 raises the potential of the control grid of the tube 21, thereby making the tube conductive. For proper operation of the circuit the potentiometer 17 is adjusted so that the impedance from the junction between the potentiometer 17 and the resistor 18 to ground is substantially equal to the characteristic impedance of the chosen artificial transmission line 19. The above-mentioned characteristic impedance is easily calculated by using well known artificial transmission line formulae and substituting the values of the lumped constants of the line therein. The value of the resistance to which the potentiometer 17 is adjusted to make the input impedance to the transmission line 19 approximately equivalent to the characteristic impedance of the line 19 is easily calculated by the use of the formula for the output impedance of a cathode follower having equivalent circuit elements.

As the tube 11 conducts and current flows in the cathode circuit, a voltage wave approximately equal to one-half of the applied grid voltage travels the length of the line 19. The latter occurs because the maximum resistance of the potentiometer 17 is chosen to be low as compared to the resistance of the resistor 18 and because the cathode voltage of a tube connected in the manner of tube 11 follows the grid voltage and has approximately the value thereof. It is well known that a pulse of voltage applied to an open circuit transmission line will start a traveling wave from the input end which charges the line to one-half the value of the applied voltage during the time it takes such a traveling wave to traverse the length of line. Since the output end of the line is open, a reflected wave of one-half the value of the applied voltage is formed which then charges the line to the full value of the applied voltage during the time of travel back to the input end of the line. Therefore current flow through the tube causes a voltage to develop across the input to the transmission line, which is approximately equal to the value of the input voltage of the tube 11 and starts a traveling wave down the line 19 which is approximately equal to one-half of the value of input pulse of voltage. At a time twice the time constant of the selected artificial line, the line is fully charged to approximately the value of the input pulse of voltage. Since the input impedance of the line 19 has been adjusted by the potentiometer 17 to be substantially equal to the characteristic impedance of the line, there will be no further reflected waves and the waveform 52, as shown on Fig. 2, is representative of the voltage at the input to the line.

Now, since the current flowing through the resistor 18 is the same as that through the dropping resistor 16, the voltage developed across the resistor 16 becomes a square wave 53 having a stepped appearance, as shown on Fig. 2, which is the difference between the grid and cathode voltages of the tube 11, as shown by the waveforms 51 and 52, respectively, on Fig. 2. The voltage then, as taken from the anode of the tube 11 and coupled to the control grid of the tube 21, is proportional in height to the input pulse of voltage and has a duration approximately equivalent to twice the time constant of the artificial transmission line 19.

As stated previously, the tube 21 and associated circuit elements are interconnected in the form of a conventional amplifier. Therefore the pulse of voltage developed at the anode of the tube 21 is amplified and inverted by the tube 21 so that the voltage has a waveform 54, as shown on Fig. 2.

To insure that the pulse is flat on top, but still preserve the pulse height proportionality, the voltage developed at the anode of the tube 21 is impressed on the control grid of the cathode follower tube 31 having a flattening network connected into the cathode circuit. Since the cathode follows the control grid voltage, a positive pulse of voltage having the waveform 54 is divided across the two cathode resistors 34 and 36. The voltage across the resistor 36 then has the waveform 55, as shown on Fig. 2, which is similar to waveform 54, but reduced in height by a constant fractional amount. It will be readily apparent that, at the time the voltage at the junction between the two resistors 34 and 36 becomes more positive than the condenser 37, a charging current will flow through the diode crystal 38 to charge the condenser 37. Since the maximum value of voltage of the pulse occurs at the leading edge thereof, the condenser will be charged to a maximum value immediately. With the diode crystal 39 connected between the condenser 37 and the cathode of the tube 31 in such polarity that the condenser can discharge therethrough only when the cathode is less positive than the condenser, the condenser will maintain the maximum charge until such time as the trailing edge of the pulse occurs. Thus the voltage across the condenser 37 is substantially a rectangular wave 56, as shown on Fig. 2, and has a flattened top.

Provided as a low impedance output for the pulse shaping circuit is a triode cathode follower tube 41. The voltage across the condenser 37 is coupled to the control grid of the cathode follower tube 41 and the output voltage having a waveform 56, as shown on Fig. 2, is supplied to the output terminal 43.

From the foregoing it is seen that from an input pulse of voltage having a trailing, trailing-edge, a pulse of voltage has been formed with a flat top, a definite predetermined duration, and a height proportional to the height of the input of voltage.

While the salient features of the invention have been described in detail with respect to a particular embodiment it will, of course, be apparent that numerous modifications may be made within the spirit and scope of this invention, and it is therefore not desired to limit the invention to the exact details shown except insofar as they may be defined in the following claims.

What is claimed is:

1. A pulse shaping circuit comprising an electron tube having at least an anode, a control grid, and a cathode, source means connected to said anode for applying an operating voltage thereto, means for impressing a signal pulse of voltage on said control grid, a circuit network connected to said cathode and including a pair of series resistors with one end of an open circuit artificial transmission line connected to the junction between said resistors, amplifying means for inverting the pulse of voltage developed at said anode, and cathode follower means connected to said amplifying means and having a diode gating circuit connected in the cathode circuit of said cathode follower for flattening the top of said inverted pulse of voltage.

2. A pulse shaping circuit comprising an electron tube having at least an anode, a control grid, and a cathode, source means connected to said anode for supplying an operating voltage thereto, means for impressing a signal pulse of voltage on said control grid, a potentiometer and a resistor series connected between said cathode and ground respectively, an open circuit artificial transmission line connected to the junction between said potentiometer and said resistor, said potentiometer being adjusted so that the input impedance to said line is substantially equal to the characteristic impedance of said line, amplifying means for inverting the resultant pulse of voltage developed at said anode which is the difference between the voltage at said control grid and cathode, and cathode follower means connected to said amplifying means and having a diode gating circuit connected in the cathode circuit of said cathode follower for flattening the top of said inverted pulse of voltage.

3. A pulse shaping circuit comprising an open circuit delay line pulse sharpener, an amplifier connected to the output of said pulse sharpener, and a cathode follower connected to said amplifier, said cathode follower having a pair of series connected resistors connected between the cathode and ground, a first diode crystal connected at one end to the junction between said resistors and at the other end to one side of a condenser the other side of which is connected to ground, a second diode crystal being connected between the ungrounded side of said condenser and said cathode, the polarity of said diode crystals being such that a current will flow through said first crystal when the junction between said resistors is more positive than said condenser and through said second crystal when the condenser is more positive than said cathode.

4. A pulse shaping circuit comprising an open circuit delay line pulse sharpener, an amplifier connected to the output of said pulse sharpener, and a cathode follower connected to said amplifier, a first resistor having one end thereof connected to the cathode of said cathode follower, a second resistor connected between the other end of said first resistor and ground, a first and second rectifying means connected in series across said first resistor, and condenser means connected between the junction of said rectifying means and ground, the polarity of said rectifying means being such that current will flow through the first when said condenser is less positive than the resistor common point and through the second when said condenser is more positive than said cathode.

5. A pulse shaping circuit comprising a triode tube having an open circuit transmission line connected across a resistor in the cathode circuit thereof, the control grid of said tube being connected to a source of positive pulses, means connected to the anode of said tube for supplying an operating voltage thereto, amplifying means connected to the anode of said tube to invert voltage variations thereat, a cathode follower circuit connected to said amplifying means, a pair of diode rectifiers series connected across a portion of a voltage divider in the cathode circuit of said cathode follower so that conduction will occur toward the cathode of said cathode follower, a storage condenser connected to the junction between said rectifiers, and a cathode follower output circuit connected across said condenser.

WILLIAM E. GLENN, JR.

REFERENCES CITED

The following references are of record in the file of this patent:

UNITED STATES PATENTS

| Number | Name | Date |
|---|---|---|
| 2,255,839 | Wilson | Sept. 16, 1941 |
| 2,266,154 | Blumlein | Dec. 16, 1941 |